United States Patent [19]
Byun

[11] Patent Number: 5,193,742
[45] Date of Patent: Mar. 16, 1993

[54] METHOD FOR CONTROLLING OPERATION OF AIR-CONDITIONER TO ADJUST ROOM TEMPERATURE AUTOMATICALLY

[75] Inventor: Il S. Byun, Seoul, Rep. of Korea

[73] Assignee: Gold Star Co., Ltd., Seoul, Rep. of Korea

[21] Appl. No.: 828,452

[22] Filed: Jan. 31, 1992

[30] Foreign Application Priority Data

Feb. 1, 1991 [KR] Rep. of Korea ............... 1739/1991

[51] Int. Cl.$^5$ ............................................. F24F 13/00
[52] U.S. Cl. ..................................... 236/49.3; 62/186
[58] Field of Search ............... 236/49.3, 38, DIG. 9, 236/46 R; 165/16; 62/180, 186

[56] References Cited

U.S. PATENT DOCUMENTS

| | | | |
|---|---|---|---|
| 4,738,116 | 4/1988 | Himeno et al. | 236/49.3 X |
| 4,782,999 | 11/1988 | Ishii et al. | 236/49.3 |
| 4,807,444 | 2/1989 | Aoki et al. | 62/186 |
| 4,877,183 | 10/1989 | Matsuda et al. | 62/186 |
| 5,046,549 | 9/1991 | Isono | 236/49.3 X |
| 5,072,878 | 12/1991 | Aoki et al. | 236/38 |

Primary Examiner—Harry B. Tanner
Attorney, Agent, or Firm—Spencer, Frank & Schneider

[57] ABSTRACT

A method for controlling the operation of an air-conditioner to optimize the temperature in a room automatically, by utilizing the relationship between a predetermined optimum room temperature and a current room temperature sensed at a predetermined time interval. Upon the selection of the optimum room temperature by an operator, the air-conditioner calculates room temperature values corresponding to a cooling operation start and a cooling operation stop, by using the optimum room temperature value and then stores the room temperature value. Thereafter, the air-conditioner senses the current room temperature value at a predetermined time interval and then compares the current room temperature value with the stored room temperature values corresponding to the cooling operation start and the cooling operation stop. According to the comparison, the position of a louver controlling the flow amount and the flow direction of cool air and the rotational speed of a fan motor controlling the flow rate of cool air can be properly controlled, thereby enabling the room temperature to be always maintained properly. In accordance with the method, a delightful optimum room temperature can be always maintained, without any troublesome manual adjustment of the operation condition of the air-conditioner.

6 Claims, 11 Drawing Sheets

METHOD FOR CONTROLLING OPERATION OF AIR-CONDITIONER TO ADJUST ROOM TEMPERATURE AUTOMATICALLY

BACKGROUND OF THE INVENTION

1. Field of the Invention

The present invention relates in general to an air-conditioner, and more particularly to a method for controlling the operation of an air-conditioner to adjust the temperature in a room in which the air-conditioner is installed, by appropriately changing the operating condition of the air-conditioner, depending on the variation in the current room temperature, in order to always maintain a delightful room temperature.

2. Description of the Prior Art

Figure 1:
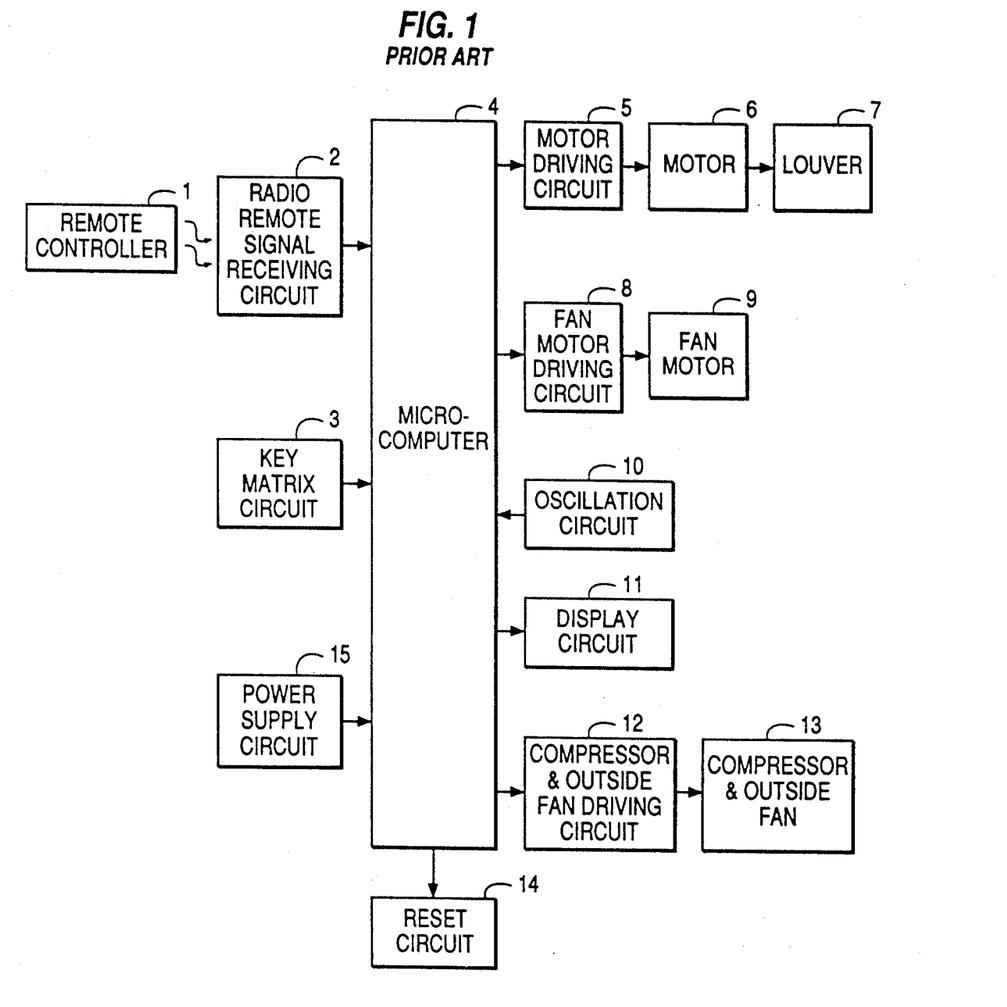
FIG. 1 is the schematic diagram showing a construction of an air-conditioner in accordance with the prior art.

With reference to FIG. 1 which is a schematic diagram showing the construction of a conventional air-conditioner, the air-conditioner comprises a remote controller 1 for generating a radio remote control signal, such as an infrared signal, according to an operator's selection, a radio remote control signal receiving circuit 2 for converting the remote control signal received thereby into a signal which is recognizable by a microcomputer 4, then outputting the recognizable signal to the microcomputer 4, and a key matrix circuit 3 for generating a control key signal in accordance with the operator's selection, then outputting the key signal to the microcomputer 4. The microcomputer 4 is electrically connected at input ports thereof to the circuits 2 and 3, respectively, thus generates control signals in response to the signals outputted from the circuits 2 and 3 thereto, then outputs the control signals. Additionally, the microcomputer 4 is electrically connected at an output port thereof to a motor driving circuit 5 for driving a motor 6 under the control of the microcomputer 4. The motor driving circuit 5 is in turn electrically connected to a louver 7 by way of the motor 6, the louver 7 being installed at a cool air discharging passage of the air-conditioner and being capable of moving upwards and downwards by virtue of the motor 6 in order to control the discharging direction of the cool air, that is, a long distance discharge or a short distance discharge of the wind, and also to control the amount of wind.

A fan motor driving circuit 8 is provided for the air-conditioner in order to drive a fan motor 9, electrically connected thereto, under the control of the microcomputer 4. The fan motor 9 is used for cooling the warm air which entered the air-conditioner from the room, by virtue of a cooling agent, such as cooling water or cooling air supplied from the outside, then supplying the cool air for the room. In addition, the rotational speed of the fan motor 9 is controlled by the fan motor driving circuit 8 in order to provide a desired discharging speed of the cool air, the cool air being conventionally classified by the discharging speed thereof into three types, such as a strong wind, a mild wind and a gentle wind. In addition, the microcomputer 4 is electrically connected at an input port thereof to an oscillation circuit 10 for outputting a clock signal to the microcomputer 4. The air-conditioner is provided with a display circuit 11 for displaying the present operation of the air-conditioner under the control of the microcomputer 4, an outside fan and compressor driving circuit 12 for driving an outside fan and a compressor 13, and a reset circuit 14 for initializing the microcomputer 4, the circuits 11, 12 and 14 being electrically connected to output port of the microcomputer 4, respectively. Additionally, a power supply circuit 15 is provided in order to supply electric power to the air-conditioner.

Figure 2:
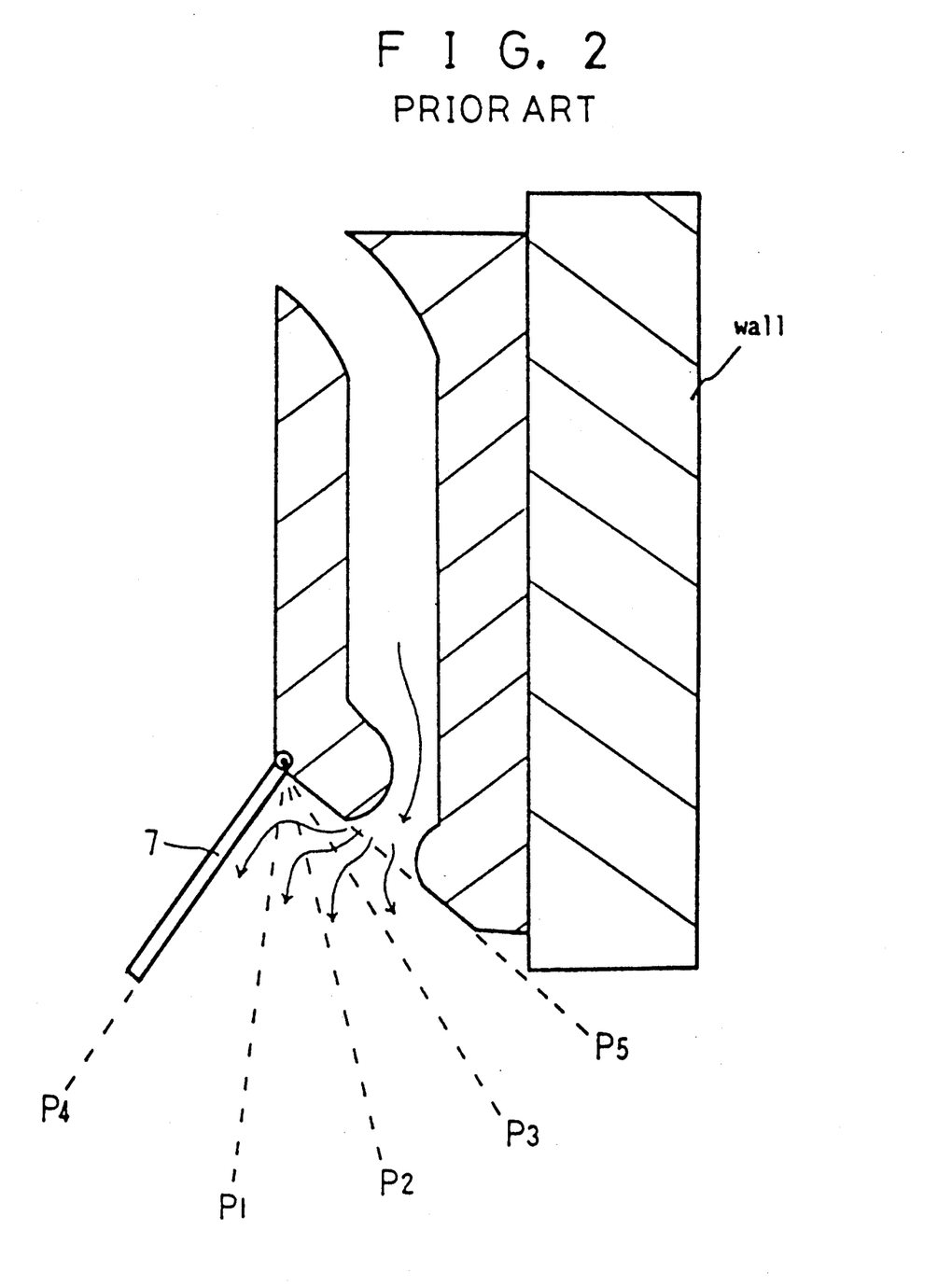
FIG. 2 which is a sectional view of a louver hinged to a cool air discharging passage of the air-conditioner of FIG. 1.

Referring next to FIG. 2 which is a sectional view of the louver 7 hinged to the cool air discharging passage of the conventional air-conditioner of FIG. 1, the louver 7 is first located at an initial position $P_4$ when the air-conditioner is turned on, and is located at another position $P_5$ when the air-conditioner is turned off.

The operation of the conventional air-conditioner having the construction shown in FIGS. 1 and 2 will be described hereinafter in conjunction with flowcharts shown FIGS. 3A and 3B. Here, a description of the general operation of the air-conditioner will be omitted because it is well known to the skilled person in the art of this invention, but control of the louver 7 and the fan motor 9 which are concerned with this invention will be described in detail.

As described above, the louver 7 is generally hinged to a portion of the cool air discharging passage. Thus, the louver 7 is capable of controlling the discharging direction and discharging amount of the cool air, thereby causing the cool air to be discharged to a range of relatively longer distance or to a range of relatively shorter distance. Here, the louver 7 is fully opened when it is intended to cause the cool air to be discharged to the longer distance range, which results in the discharge of relatively large amount of cool air, while it is slightly opened when it is intended to cause the cool air to be discharged to the shorter distance range, which results in the discharge of relatively small amounts of cool air. Briefly described, the nearer the louver 7 to the position $P_4$, the longer is the discharging distance of the cool air, and the nearer the louver 7 to the position $P_5$, the shorter the discharging distance of the cool air.

Figure 3A:
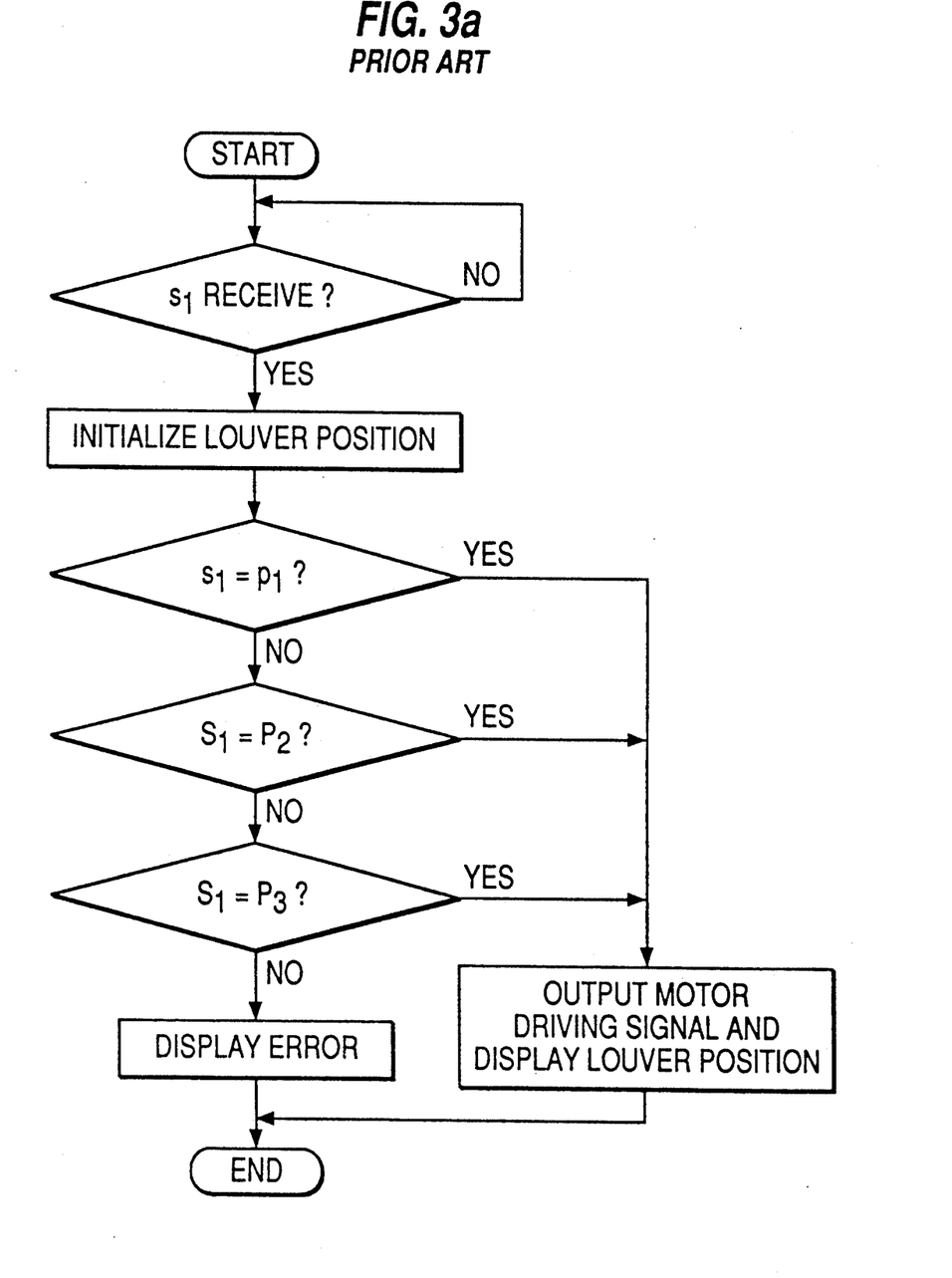
FIG. 3A is a flowchart of a control process for controlling the position of the louver of FIG. 2.

FIG. 3A shows a flowchart of a control process for controlling the position of the louver 7. Upon feeling that the air-conditioner does not appropriately provide the cool air, such as due to directly feeling the undue chill of the cool air or feeling the heat because most of the discharged cool air is supplied to unnecessary parts of the room, the operator inputs a louver location change mode signal $S_1$ to the microcomputer 4 by means of the remote controller 1 or the key matrix circuit 3, thereby causing the microcomputer 4 to perform the routine shown in FIG. 3A. First, the microcomputer 4 determines whether the signal $S_1$ for selecting the location of the louver 7 has been received. If it is determined that the signal $S_1$ has not been received, the microcomputer 4 returns to the initial step of the routine, while it initializes the location of the louver 7 when the signal $S_1$ has been received. At this time, the initial position of the louver 7 is the position $P_4$ of FIG. 2 because the air-conditioner is in operation.

Thereafter, the microcomputer 4 determines which position of the positions $P_1$ to $P_3$ corresponds to the signal $S_1$, then outputs a control signal corresponding to the determined position of the louver 7 to the motor driving circuit 5 in order to cause the louver 7 to move. At this time, the microcomputer 4 drives the display circuit 11 to display thereon the present position of the louver 7, which in turn ends the routine. For example, if the operator feels the heat and also it is determined that he is located a relatively long distance from the air-conditioner, he will control the air-conditioner in order to move the louver 7 toward the position P₄, thereby causing the cool air to be discharged to a longer distance. While he feels the undue chill of the cool air, he will control the air-conditioner in order to move the louver 7 toward the position P₅, thereby causing the cool air to be discharged to a shorter distance.

However, if it is determined that the signal $S_1$ does not correspond to any one of the positions $P_1$ to $P_3$, the microcomputer 4 recognizes the signal $S_1$ as an error signal, and drives the display circuit 11 to display an error message, and then ends the routine.

Of course, the operator can manually control the position of the louver 7.

Figure 3B:
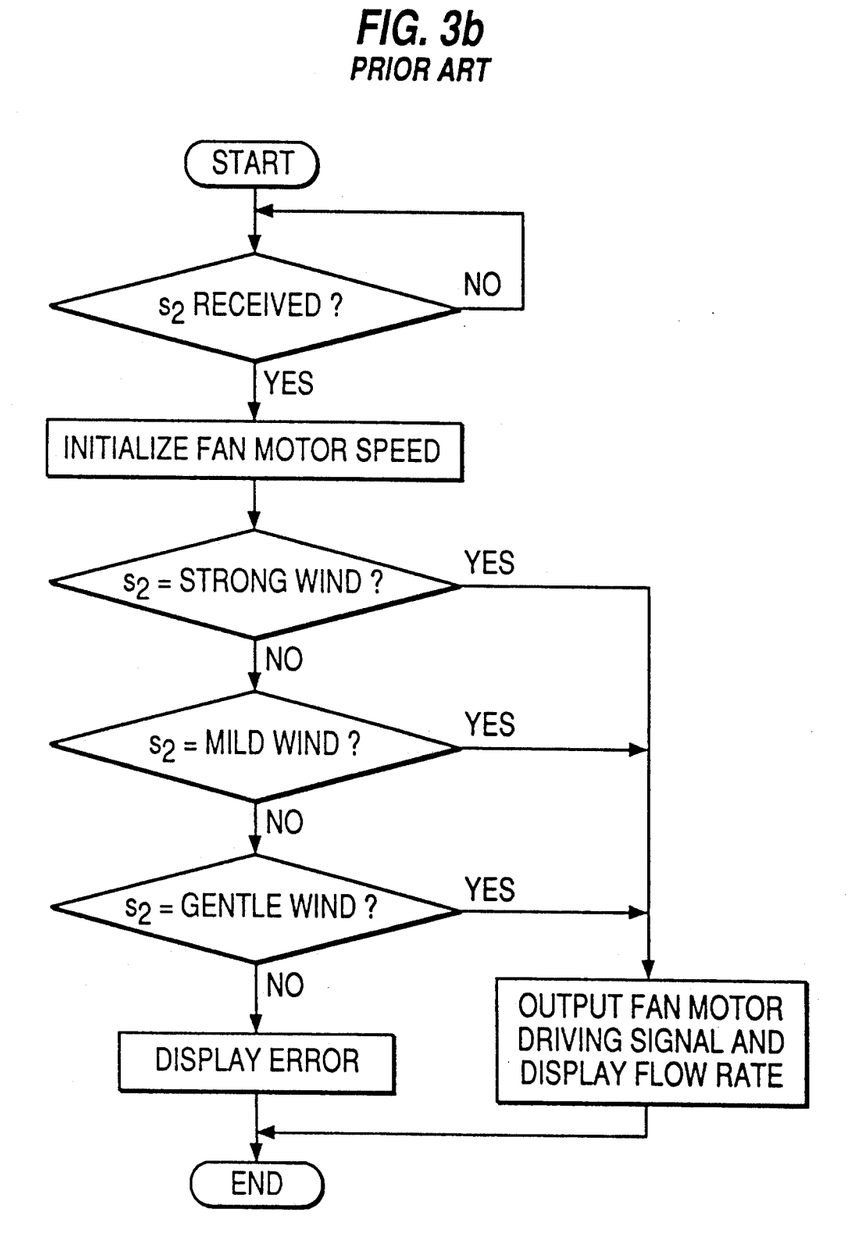
FIG. 3B is a flowchart of a control process for controlling the rotational speed of a fan motor of the air-conditioner of FIG. 1.

FIG. 3B is a flowchart of a control process for controlling the rotational speed of the fan motor 9.

Upon feeling that the discharging speed of the cool air from the air-conditioner is not appropriate, such as an unduly higher or lower speed, the operator inputs a fan motor rotational speed control mode signal to the microcomputer 4 by means of the remote controller 1 or the key matrix circuit 3, thereby causing the microcomputer 4 to perform the routine shown in FIG. 3B. First, the microcomputer 4 determines whether a signal $S_2$ for controlling the rotational speed of the fan motor 9, that is, the discharging speed of the cool air, has been received. If it is determined that the signal $S_2$ has not been received, the microcomputer 4 returns to the initial step of the routine, while it initializes the rotational speed of the fan motor 9 when the signal $S_2$ has been received. Here, the initial state of the rotational speed of the fan motor 9 means the stop state thereof.

Thereafter, the microcomputer 4 determines which type of cool air of the strong wind, the mild wind and the gentile wind corresponds to the signal $S_2$, then outputs a control signal corresponding to the determined type of cool air to the fan motor driving circuit 8 to drive the fan motor 9 at the determined rotational speed.

At the same time, the microcomputer 4 drives the display circuit 11 to display the present wind speed thereon, and ends the routine.

However, if it is determined that the signal $S_2$ does not correspond to any type of cool air, the microcomputer 4 recognizes the signal $S_2$ as an error signal, drives the display circuit 11 to display an error message, and then ends the routine.

Here, as the motor 6 does not comprise a step motor, the microcomputer 4 can not recognize the previous position of the louver 7. Thus it initializes the position of the louver 7, and then drives the motor 6 in order to locate the louver 7 at a desired position.

As described above, the conventional air-conditioner may control the discharging direction, the discharging speed and the discharging amount of cool air by manual control or radio remote control.

However, the conventional air-conditioner is provided with no device for automatically controlling the discharging direction, the discharging speed and the discharging amount of cool air in accordance with the temperature of the cool air which is practically perceived by the operator, thus it has a disadvantage in that it can not provide a delightful room having an optimum temperature by appropriately changing the operation thereof in accordance with a change of the room temperature.

SUMMARY OF THE INVENTION

It is, therefore, an object of the invention to provide a method for controlling the operation of an air-conditioner for automatically adjusting the room temperature in which the above disadvantage can be overcome and the position of a louver for controlling the discharging amount and the flow direction of cool air, the rotational speed of a fan motor for controlling the flow rate of the cool air and the driving of an outside fan and compressor for performing a cooling operation are automatically controlled, depending on the temperature difference between the current room temperature and a predetermined optimum room temperature, thereby maintaining a delightful room temperature automatically.

In the method according to this invention, the operator inputs an optimum room temperature value by using a radio remote controller or a key matrix circuit. Thus, simultaneously with storing the optimum room temperature value as a cooling operation stop value a microcomputer adds a predetermined temperature value to the optimum room temperature value in order to store the result value from the addition as a cooling operation start value. Thereafter, the microcomputer senses the current room temperature value at a predetermined time interval, then compares the sensed room temperature value with the stored cooling operation start and stop values. Thus, if the sensed room temperature value is higher than the cooling operation start value, the microcomputer stores in a memory thereof a room temperature control mode corresponding to a temperature ascending mode, then performs a cooling operation, such as an operation for driving the outside fan and compressor, corresponding to the stored control mode. However, if the sensed room temperature value is lower than the cooling operation stop value, the microcomputer stores in the memory thereof a room temperature control mode corresponding to a temperature descending mode, then performs a cooling operation, such as an operation for stopping the outside fan and compressor, corresponding to the stored control mode. On the other hand, if the sensed room temperature value is a value between the cooling operation start and stop values, the microcomputer performs a cooling operation in accordance with a control mode previously stored in the memory thereof.

Sequentially, the microcomputer controls the louver to be opened at a minimum when the control mode stored in the memory is the ascending control mode, thereby causing the flow amount of the cool air to be minimized. However, if the stored control mode is the descending control mode, the microcomputer calculates the temperature difference between the cooling operation stop value and the sensed room temperature value in order to drive the louver to be gradually opened as the temperature difference increases, thereby causing the flow amount of cool air to be gradually increased.

In addition, the microcomputer controls the fan motor to rotate at a minimum speed when the control mode stored in the memory is the ascending control mode, thereby causing the flow rate of the discharged cool air to be minimized. However, if the stored control mode is the descending control mode, the microcomputer calculates the temperature difference between the cooling operation stop value and the sensed room temperature value in order to drive the fan motor to rotate at a gradually increasing rotational speed as the temperature difference increases, thereby causing the flow rate of the cool air to be gradually increased. Thus, the air-conditioner controlling method according to the present invention can always provide an optimum room temperature which has been selected by the operator.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 4:
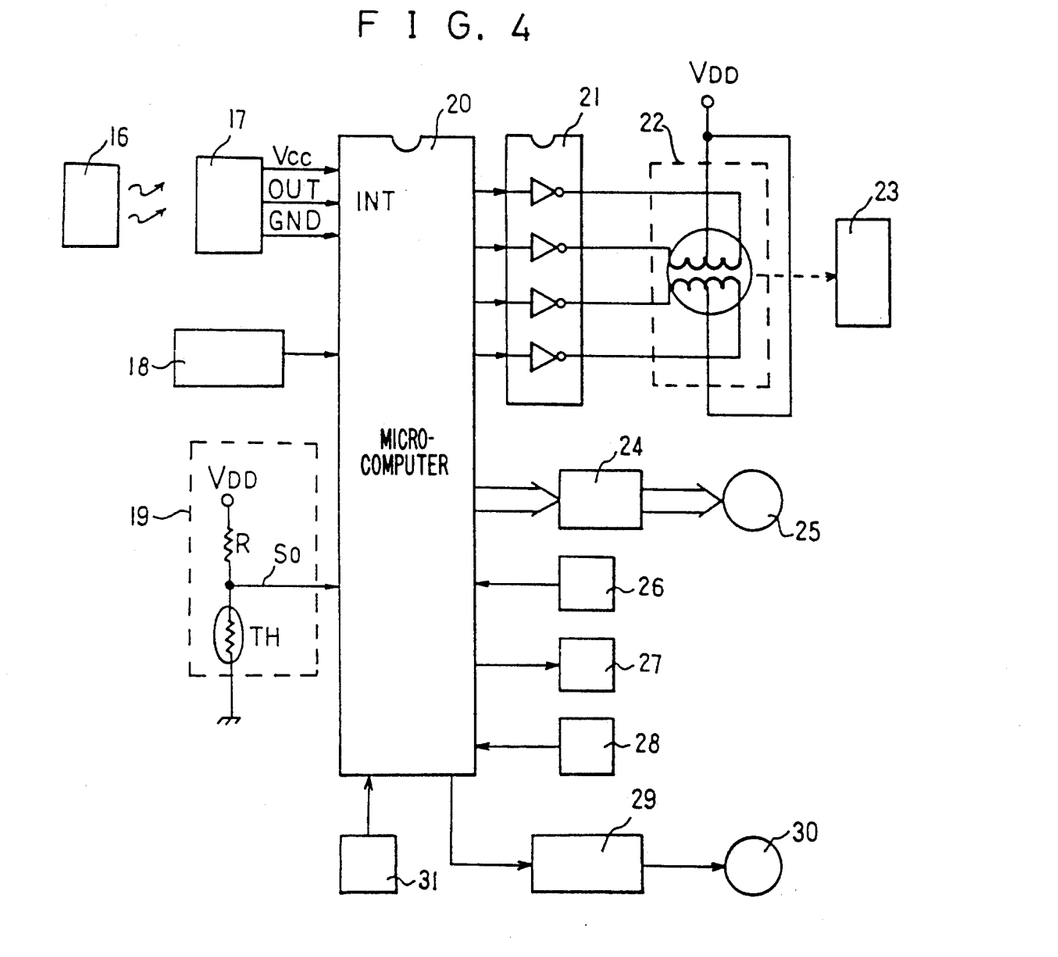
FIG. 4 is a block diagram of an air-conditioner to which the present invention is applied.

Referring to FIG. 4, there is shown a block diagram of an air-conditioner to which the present invention is applied. As shown in FIG. 4, the air-conditioner comprises a remote controller 16 for generating a radio remote control signal (for example, an infrared ray signal) according to an operator's selection, a radio remote control signal receiving circuit 17 for converting the received remote control signal into a signal which is capable of being recognized by a microcomputer, and a key matrix circuit 18 for generating a control key signal in accordance with the operator's selection. The air-conditioner also comprises a temperature sensing circuit 19 including, for example, a thermistor TH, a resistor R and a power source $V_{DD}$ for and sensing the temperature in a room in which the air-conditioner is disposed and generating a signal indicative of the sensed temperature, and a microcomputer 20 for generating a predetermined control signal in response to the signal from the radio remote signal receiving circuit 17 or the key matrix circuit 18 and the signal from the temperature sensing circuit 19. Also, the air-conditioner comprises a step motor 22, a step motor drive circuit 21 for controlling the step motor 22 according to the control signal from the microcomputer 20, a louver 23 disposed in a passage for discharging cool air from the air-conditioner and adapted to control the direction and the flow of the cool air according to the rotation of the step motor 22, a fan motor 25 for changing warm air received from the room into cool air by using a cooling medium supplied from the outside and supplying the cool air to the room, and a fan motor drive circuit 24 for driving the fan motor 25 under the control of the microcomputer 20. The air-conditioner further comprises an oscillation circuit 26 for supplying a clock signal to the microcomputer 20, a display circuit 27 for displaying the operation condition of the air-conditioner under the control of the microcomputer 20, a power supply circuit 28 for supplying electric power to the microcomputer 20, an outside fan and compressor 30 for carrying out a cooling operation function, that is, the function of cooling a heat exchanging medium, such as water or gas, coming into the room and supplying the cooled medium, an outside fan and compressor driving circuit 29 for driving the outside fan and compressor 30 under the control of the microcomputer 20, and a reset circuit 31 for resetting the microcomputer 20.

Figure 5:
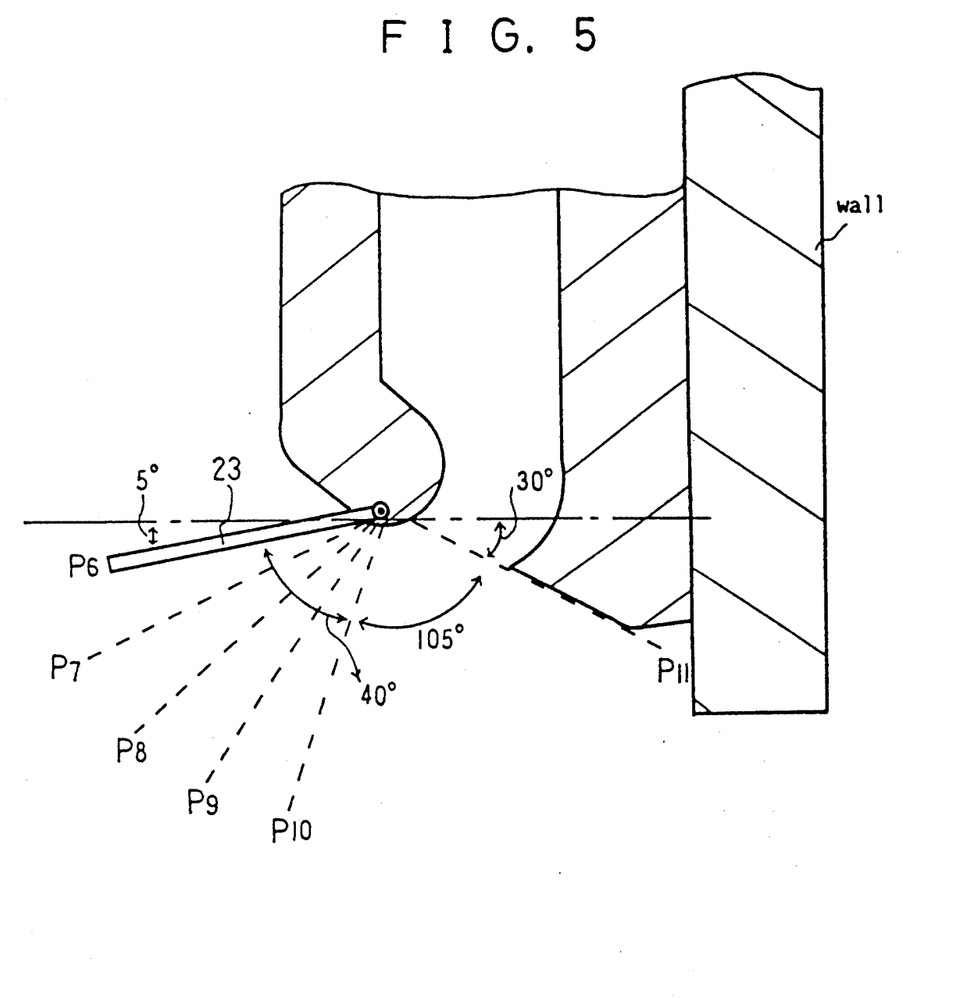
FIG. 5 is a schematic view for explaining the shift in the position of a louver according to the control of the air-conditioner shown in FIG. 4.

FIG. 5 is a schematic view for explaining the shift in the position of the louver 23 according to the control of the microcomputer 20 and the shift in the discharging direction of the cooled air, depending on the shifted position of the louver 23.

In FIG. 5, the position P11 of the louver 23 corresponds to the condition where the air-conditioner is at its power-off state, whereas the position P6 corresponds to the initial position of the louver 23 when the air-conditioner is at its power-on state. The operation of the louver 23 will be described in detail, hereinafter.

Now, the control of the room temperature according to the present invention will be described, in conjunction with FIGS. 5 to 10.

Figure 6:
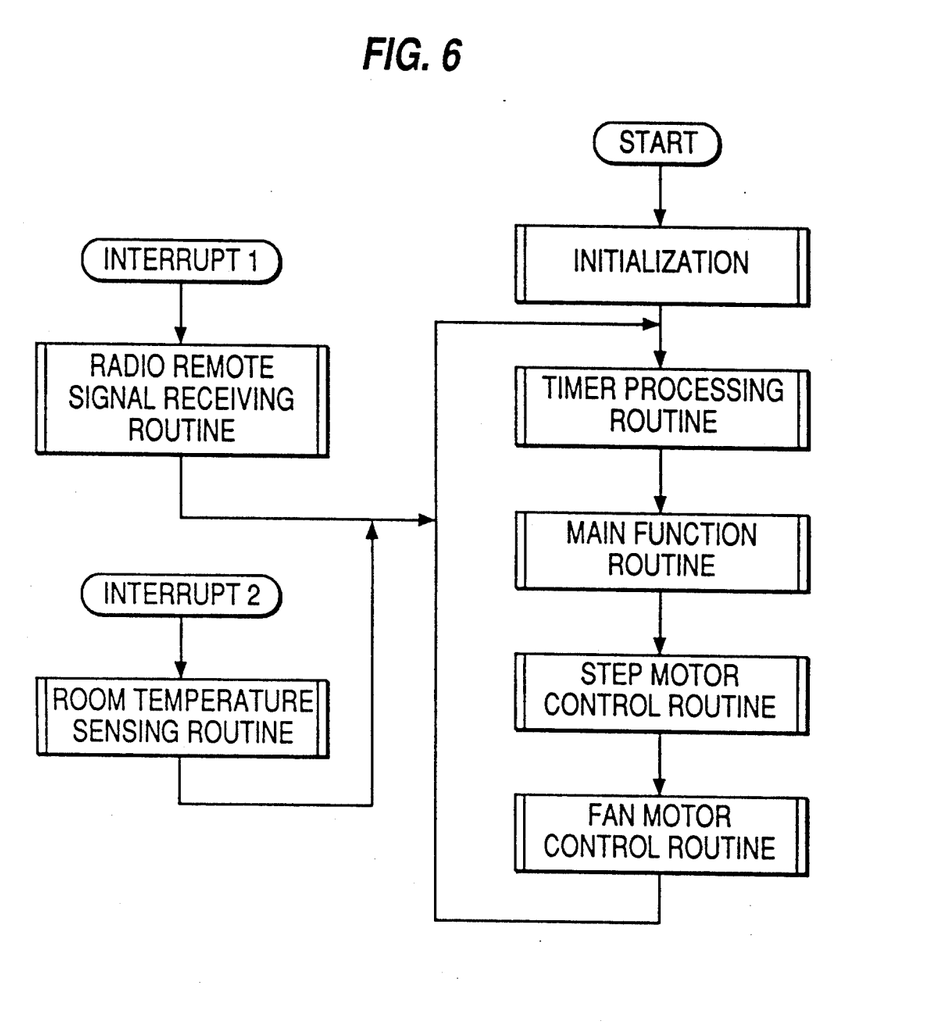
FIGS. 6 to 9 are flowcharts illustrating the operation of the air-conditioner shown in FIG. 4, respectively.

As illustrated in FIG. 6 which shows a main routine of the control of the room temperature according to the present invention, when electric power from the power supply circuit 28 shown in FIG. 4 is applied to the microcomputer 20, the oscillation circuit 26 operates to apply a clock signal to the microcomputer 20. At this time, the reset circuit 31 operates to initialize the microcomputer 20.

Subsequently, the radio remote signal receiving circuit 17 receives radio remote signals corresponding to a cooling operation signal and an optimum room temperature signal, respectively, and transmit the received signals to the microcomputer 20. Upon receiving the cooling operation signal and the optimum room temperature signal, the microcomputer 20 performs a radio remote signal receiving routine and store the cooling operation mode and the optimum room temperature in one of its internal RAMs. Of course, the operator may perform the inputting of the cooling operation signal and the optimum room temperature signal, by means of the key matrix circuit 18, in place of the remote controller 16. The microcomputer 20 also receives a signal indicative of the current room temperature, via the room temperature sensing circuit 19. Upon receiving the current room temperature signal, the microcomputer 20 performs a room temperature sensing routine and stores the current room temperature in another RAM thereof. In this case, the microcomputer 20 receives the room temperature from the thermistor TH of the room temperature sensing circuit 19 at the time interval of one second.

Thereafter, the microcomputer 20 performs a timer processing sub-routine and then a main function sub-routine, as shown in the main routine of FIG. 6. Herein, the timer processing sub-routine means the routine for driving a timer (not shown) according to a signal indicative of reserve operation time and received in the microcomputer 20 via the remote controller 16 or the key matrix circuit 18, according to the operator's selection. The microcomputer 20 compares the current timer time with the reserve operation time of the air-conditioner. If the current timer time is not included in the reserve operation time, the microcomputer 20 then ends all procedures, without performing the main function sub-routine. That is, the microcomputer 20 determines whether the air-conditioner is at its power-on state, as shown in the main function flow chart of FIG. 7. If the air-conditioner is at its power-on state, the microcomputer 20 then determines whether the air-conditioner is in its cooling operation mode. If the air-conditioner is not at its power-on state, the microcomputer 20 stops all functions of the air-conditioner and then ends the prosecution of the main function sub-routine.

When the air-conditioner is not in the cooling operation, the prosecution of the main function sub-routine is ended. If the air-conditioner is in the cooling operation, the microcomputer 20 compares the optimum room temperature stores in an internal RAM thereof via the radio remote signal receiving routine of FIG. 6 and the current room temperature sensed by the room temperature sensing circuit 19 and stored in another internal RAM via the room temperature sensing routine of FIG. 6. At this time, if the current room temperature is higher than a predetermined cooling-on temperature that is predetermined, for example, to be higher than a selected optimum room temperature by +1.5° C., the microcomputer 20 stores an operation mode wherein the air-conditioner operates to descend the gradient of the room temperature, in a predetermined internal RAM thereof. At the same time, the microcomputer 20 informs of this operation via the display circuit 27 and then turns on the outside fan and compressor 30, so that the air-conditioner supplies a cooling medium to the room.

Figure 7:
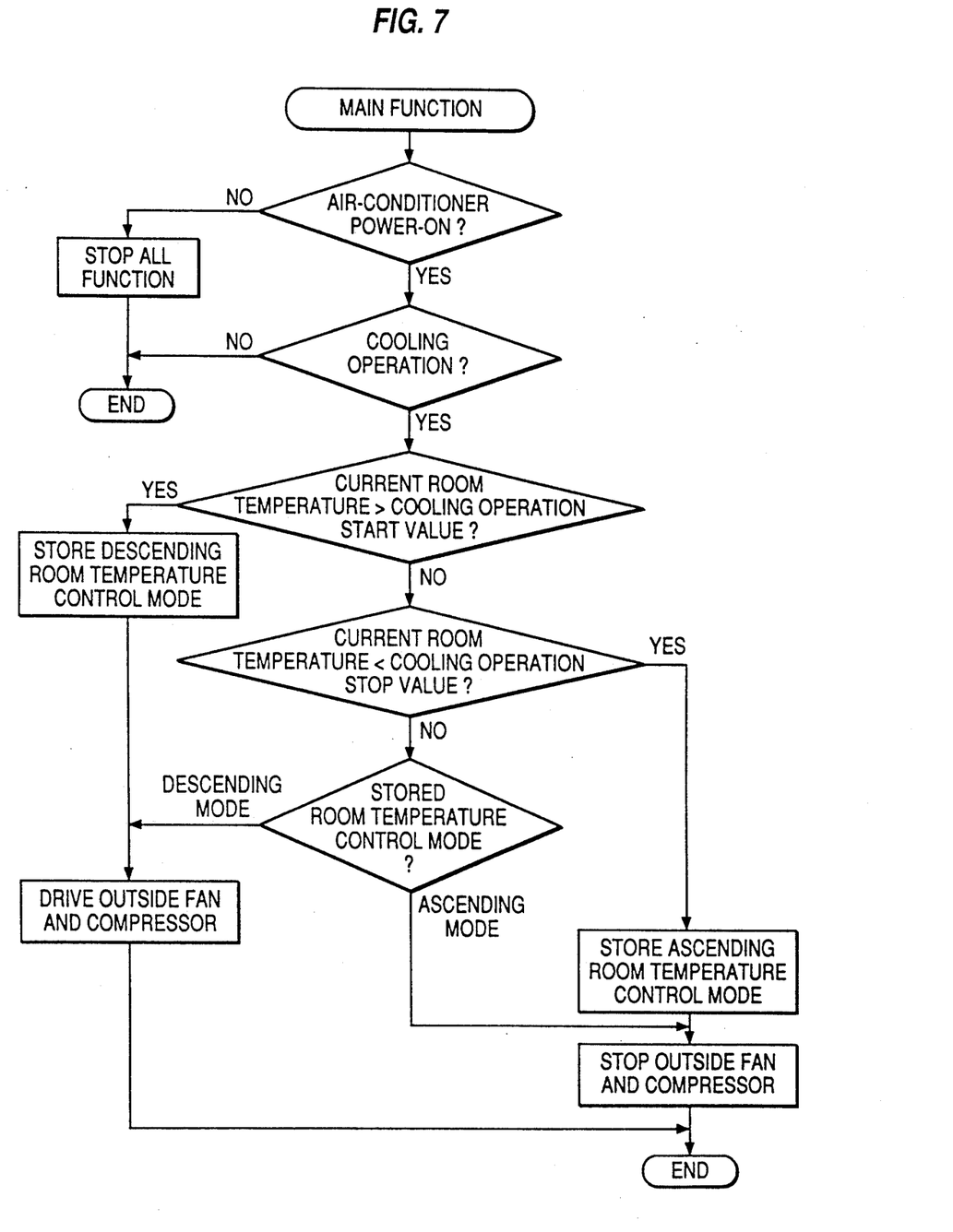
Figure 8:
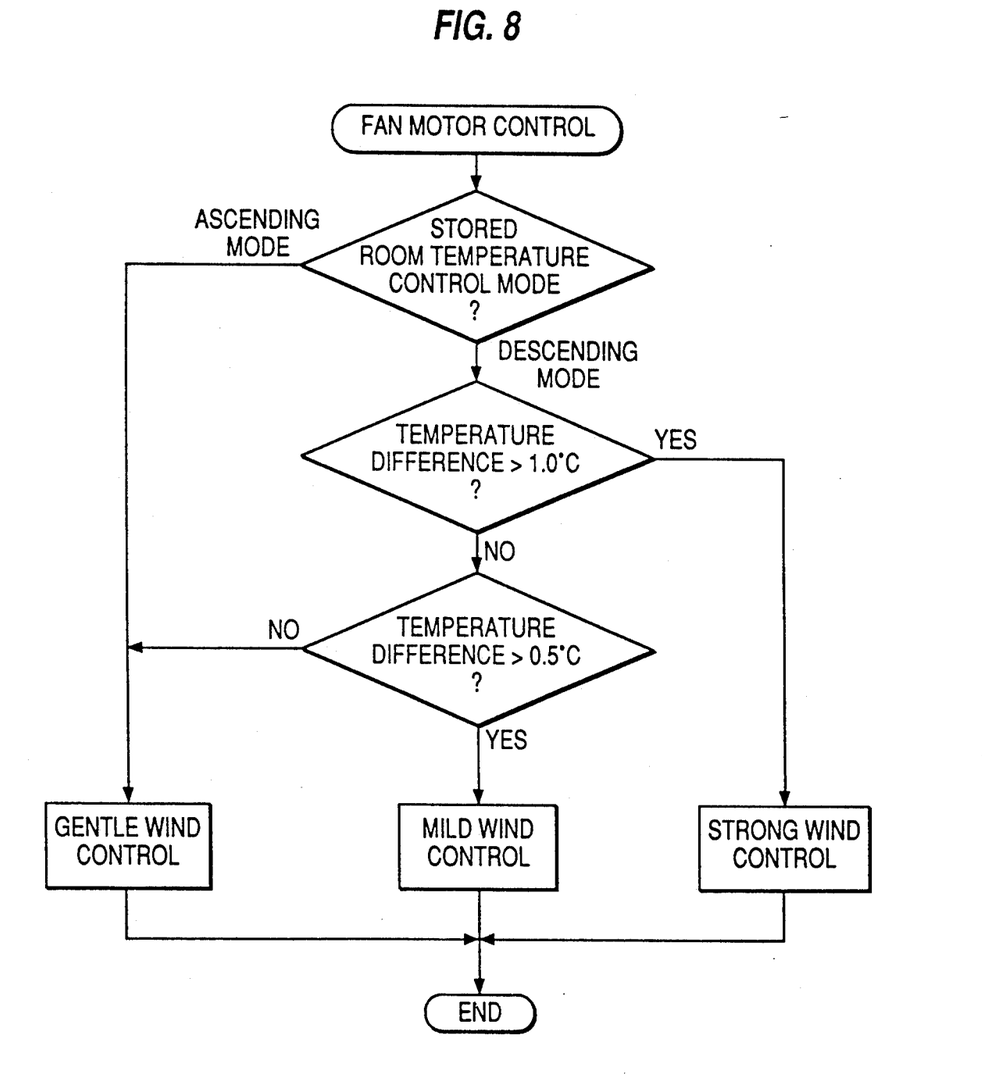
Figure 9:
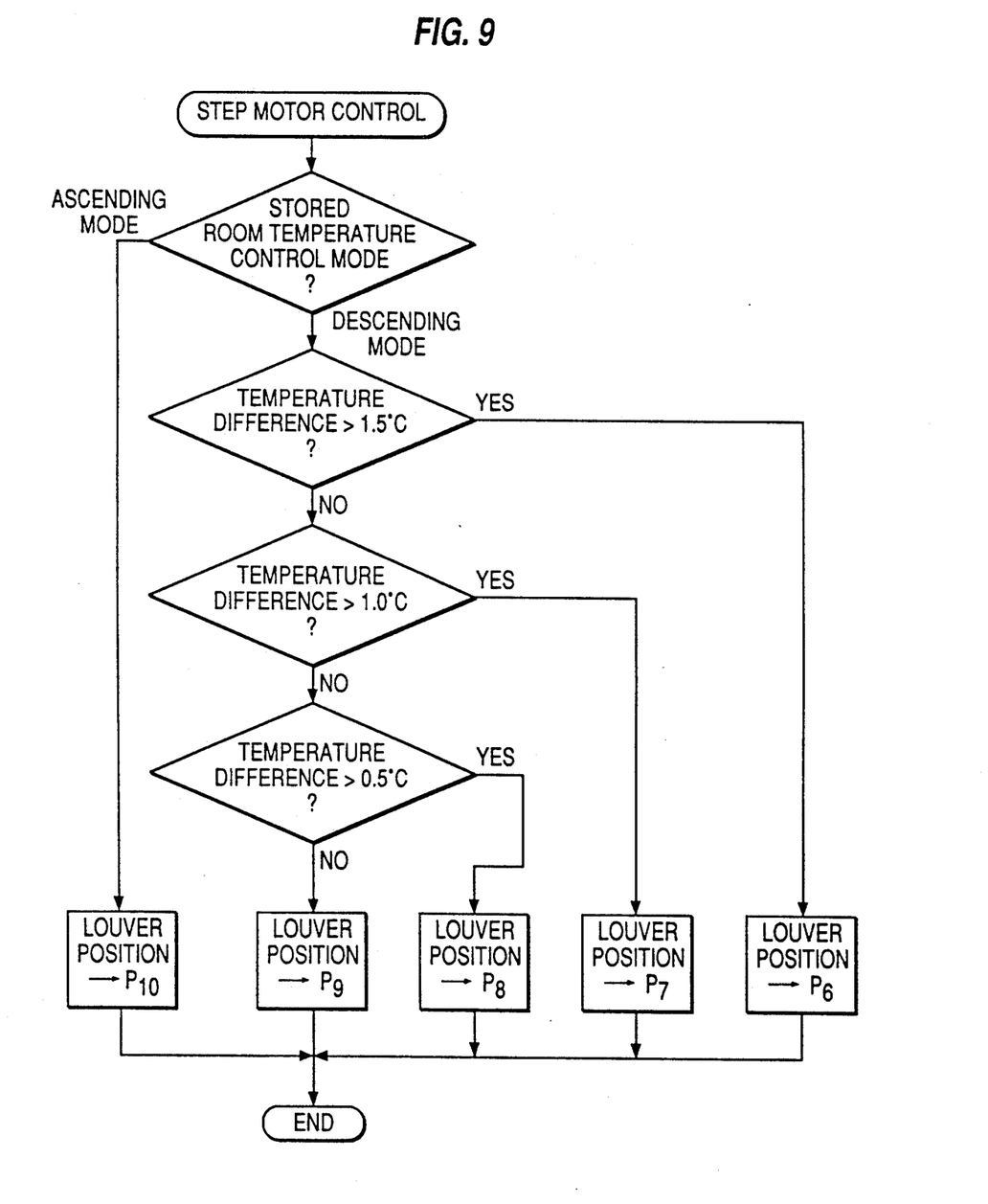
Figure 10:
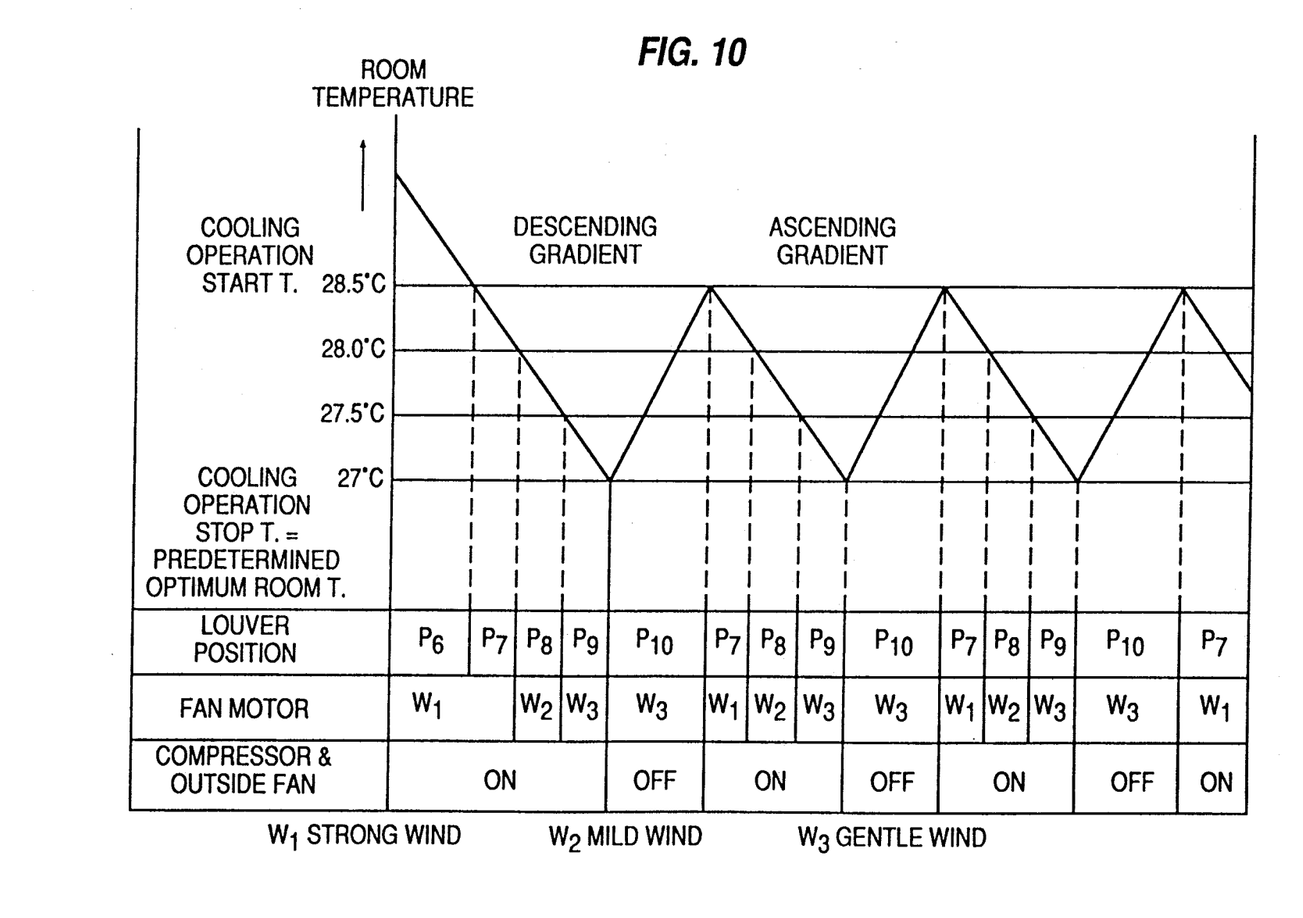
FIG. 10 is a graph showing the relationship between the room temperature and an optimum room temperature and showing respective operating conditions of parts of the air-conditioner.

However, when the current room temperature is lower than a predetermined cooling-on temperature, the microcomputer compares the current room temperature with a cooling off temperature that is predetermined, for example, to correspond to the selected optimum room temperature. If the current room temperature is higher than the cooling-off temperature, the microcomputer 20 determines whether the gradient of the current room temperature is at an ascending state (that is, the OFF state of the outside fan and compressor 30) or at a descending state (that is, the ON state of the outside fan and compressor 30).

If the gradient of the current room temperature is at the ascending state, the microcomputer 20 turns on the outside fan and compressor 30 and then ends the prosecution of the main function routine. On the other hand, when the gradient of the current room temperature is at the descending state, the microcomputer 20 turns off the outside fan and compressor 30 and then ends the prosecution of the main function routine.

However, when the current room temperature is lower than the cooling-off temperature (that is, the selected optimum room temperature), the microcomputer 20 stores an operation mode wherein the air-conditioner operates to ascend the gradient of the room temperature, in another predetermined internal RAM thereof. At the same time, the microcomputer 20 informs of this operation via the display circuit 27 and then turns off the fan and compressor 30. Thereafter, the microcomputer 20 ends the prosecution of the main function sub-routine.

After the above-mentioned prosecution of the main function sub-routine, the microcomputer performs the step motor control routine shown in FIG. 6, so as to control the position of the louver 23 of FIG. 4 disposed in the cool air discharging passage of the air-conditioner. The control procedure will now be described in detail, in conjunction with FIGS. 5 and 10.

First, the microcomputer 20 determines the room temperature gradient condition (refer to FIG. 10) stored in the predetermined RAM via the routine of FIG. 7. If the gradient of the room temperature is at the ascending state (that is, the OFF state of the outside fan and compressor 30), the microcomputer 20 operates the shift the louver 23 to the position P10 of FIG. 5 and then ends the prosecution of the step motor control routine. At the position P10, the louver 23 is opened at a minimum, so as to increase the room temperature. In the illustrated embodiment of the present invention, the position P10 corresponds to the position spaced 105° from the closed position P11 that is the position of the louver 23 when the air-conditioner is at its power-off state. The angle is the minimum opened angle of the louver 23.

When the gradient of the room temperature is at the descending state (that is, the ON state of the outside fan and compressor 30), the microcomputer 20 determines whether the difference between the current room temperature and the predetermined optimum room temperature is more than 1.5° C. When the temperature difference is more than 1.5° C., the microcomputer 20 operates to shift the louver 23 to the position P6 of FIG. 5 and then ends the prosecution of the step motor control routine. At the position P6, the louver 23 has the maximum opened angle of 145° C. The position P6 corresponds to the initial position of the louver 23 when the air-conditioner is not at its power-on state.

If the temperature difference is more than 1.5° C., the microcomputer 20 also determines whether the temperature difference is more than 1.0° C. When the temperature difference is more than 1.0° C., there is, when the temperature difference is between 1.0° C. and 1.5° C., the microcomputer 20 operates to shift the louver 23 to the position P7 by means of the step motor driving circuit 21 and the step motor 22 and then ends the prosecution of the step motor control routine. At this time, the louver 23 has the opened angle of 137°, as shown in FIG. 5.

If the temperature difference is less than 1.0° C., the microcomputer 20 also determines whether the temperature difference is more than 0.5° C. When the temperature difference is more than 0.5° C., that is, when the temperature difference is between 0.5° C. and 1.0° C., the microcomputer 20 operates to shift the louver 23 to the position P8 by means of the step motor 22 and then ends the prosecution of the step motor control routine. At this time, the louver 23 has the opened angle of 129°.

When the temperature difference is less than 0.5° C., the microcomputer 20 operates to shift the louver 23 to the position P9 by means of the step motor 22 and then ends the prosecution of the step motor control routine. At this time, the louver 23 has the opened angle of 121°.

Thus, the position of the louver 23 installed in the air-conditioner is automatically and properly adjusted, depending on the current room temperature. After the prosecution of the step motor control routine of FIG. 9, the microcomputer 20 performs a fan motor control routine shown in FIG. 8. The procedure of the fan motor control routine will not be described, in conjunction with FIGS. 8 and 10.

First, the microcomputer 20 checks the room temperature gradient condition stored in the predetermined RAM via the routine of FIG. 7. If the gradient of the room temperature is at the ascending state (that is, the OFF state of the outside fan and compressor 30), the microcomputer 20 controls the rotational speed of the fan motor 25 to be the rotational speed at which a gentle wind W3 is generated and then ends the prosecution of the fan motor control routine. At this time, the position of the louver 23 corresponds to the position P10 of FIG. 5. The fan motor 25 is at its gentle wind generating state. On the other hand, the outside fan and compressor 30 is at its OFF state.

If the gradient of the room temperature is at the descending state, the microcomputer 20 determines whether the difference between the current room temperature and the predetermined optimum room temperature is more than 1.0° C. When the temperature difference is more than 1.0° C., the microcomputer 20 controls the rotational speed of the fan motor 25 to be the rotational speed at which a strong wind W1 is generated and then ends the prosecution of the fan motor control routine. At this time, the position of the louver 23 corresponds to the position P6 of FIG. 5. The fan motor 25 is at its strong wind generating state. On the other hand, the outside fan and compressor 30 is at its ON state.

However, when the temperature difference is less than 1.0° C., the microcomputer 20 also determines whether the temperature difference is more than 0.5° C. If the temperature difference is more than 0.5° C., that is, when the temperature difference is between 0.5° C. and 1.0° C., the microcomputer 20 controls the rotational speed of the fan motor 25 to be the rotational speed at which a mild wind W2 generates and then ends the prosecution of the fan motor control routine. At this time, the position of the louver 23 corresponds to the position P8 of FIG. 5. The fan motor 25 is at its mild wind generating state. On the other hand, the outside fan and compressor 30 is at its ON state.

If the temperature is less than 0.5° C., the microcomputer 20 controls the rotational speed of the fan motor 25 to be the rotational speed at which a gentle wind W3 is generated and then ends the prosecution of the fan motor control routine. At this time, the position of the louver 23 corresponds to the position P9 of FIG. 5. The fan motor 25 is at its gentle wind generating state. On the other hand, the outside fan and compressor 30 is at its ON state.

After the above-mentioned prosecution of the fan motor control routine, the control procedure of the microcomputer 20 returns to execute the timer processing routine so that the microcomputer 20 repeats subsequent control operations.

As apparent from the above description, the present invention provides a method for controlling an air-conditioner wherein the rotational speed of a fan motor and the position of a louver are automatically adjusted, depending on the variation in the current room temperature, when the room temperature is decreased by the operation of an outside fan and compressor. By the adjustment of the rotational speed of the fan motor and the position of the louver, the flow amount and the flow direction of cool air supplied to the room is automatically controlled, so that a delightful optimum room temperature can be always maintained, without any troublesome manual adjustment of the flow amount and the flow direction of cool air. In other words, the present invention provides a convenience to operators, in that the rotational speed of the fan motor and the position of the louver are automatically controlled, according to the difference between the current room temperature and the optimum room temperature selected during the cooling operation of the air-conditioner.

Although the preferred embodiments of the invention have been disclosed for illustrative purpose, those skilled in the art will appreciated that various modifications, additions and substitutions are possible, without departing from the scope and spirit of the invention as disclosed in the accompanying claims.

What is claimed is:

1. A method for controlling the operation of an air-conditioner to adjust the temperature in a room in which the air-conditioner is installed, comprising the steps of:
    (a) inputting an optimum room temperature selected by an operator;
    (b) storing the value of the optimum room temperature as a cooling operation stop value and adding a predetermined temperature value to the cooling operation stop value to calculate the cooling operation start value, and then storing the calculated cooling operation start value;
    (c) sensing and storing the current room temperature at a predetermined time interval;
    (d) comparing the current room temperature sensed at the predetermined time interval with the stored cooling operation stop value and the stored cooling operation start value;
    (e) determining whether the room temperature rises or drops, on the basis of the comparison, storing a room temperature ascending mode or a room temperature descending mode, according to the determination, and performing a cooling operation corresponding to the stored mode;
    (f) controlling the flow amount and the flow direction of cool air supplied to the room, depending on the difference between the current room temperature and the optimum room temperature and the stored room temperature ascending or descending mode; and
    (g) controlling the flow rate of cool air supplied to the room, depending on the difference between the current room temperature and the optimum room temperature and the stored room temperature ascending or descending mode.

2. A method in accordance with claim 1, further comprising the steps of:
    inputting and storing reserve timing data for performing an operation of the air-conditioner selected by an operator prior to step (d);
    comparing the current time with the reserve timing data; and
    performing step (e) if the current time is in a reserve period corresponding to the reserve timing data, while ending all procedures if the current time is not in said reserve period.

3. A method in accordance with claim 1, further comprising the steps of:
    checking the operation condition of the air-conditioner after step (c) and before step (d); and
    performing step (d) only if the air-conditioner is at its power-on state and in cooling operation, while ending all procedures if the air conditioner is not in the power-on state and in cooling operation.

4. A method in accordance with claim 1, wherein step (e) comprises the steps of:

storing the room temperature descending mode in a predetermined memory when the current room temperature is higher than the stored cooling operation start value and performing a cooling operation corresponding to the room temperature descending mode;

storing the room temperature ascending mode in the predetermined memory when the current room temperature is lower than the stored cooling operation stop value and performing a cooling operation corresponding to the room temperature ascending mode; and performing a cooling operation corresponding to the previously stored room temperature control mode in the predetermined memory when the current room temperature is between the cooling operation start value and the cooling operation stop value.

5. A method in accordance with claim 1, wherein step (f) comprises the steps of:

supplying the flow amount of cool air to the room at a minimum, when the room temperature control mode stored in the predetermined memory corresponds to the temperature ascending mode; and checking the difference between the current room temperature and the optimum room temperature when the room temperature control mode corresponds to the temperature descending mode, and increasing gradually the flow amount of cool air supplied to the room as the temperature difference increases.

6. A method in accordance with claim 1, wherein step (g) comprises the steps of:

supplying the flow rate of cool air to the room at a minimum when the stored room temperature control mode corresponds to the temperature ascending mode; and checking the difference between the current room temperature and the optimum room temperature when the room temperature control mode corresponds to the temperature descending mode, and increasing gradually the flow rate of cool air supplied to the room as the temperature difference increases.

* * * * *